US009120403B2

(12) United States Patent (10) Patent No.: US 9,120,403 B2
Hutchinson (45) Date of Patent: Sep. 1, 2015

(54) RESTRAINT HARNESS ASSEMBLY FOR A CHILD SAFETY SEAT

(71) Applicant: Wonderland Nurserygoods Company Limited, Central Hong Kong (HK)

(72) Inventor: James M. F. Hutchinson, Mohnton, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 14/221,385

(22) Filed: Mar. 21, 2014

(65) Prior Publication Data

US 2014/0284990 A1  Sep. 25, 2014

Related U.S. Application Data

(60) Provisional application No. 61/852,790, filed on Mar. 21, 2013.

(51) Int. Cl.
*A47D 15/00* (2006.01)
*B60N 2/26* (2006.01)
*B60N 2/28* (2006.01)

(52) U.S. Cl.
CPC .............. *B60N 2/265* (2013.01); *B60N 2/2812* (2013.01); *B60N 2/2827* (2013.01); *B60N 2/2851* (2013.01)

(58) Field of Classification Search
CPC .... B60R 22/357; B60N 2/286; B60N 2/2893; B60N 2/2887; B60N 2/2806
USPC .................................. 297/476, 253, 474, 485
See application file for complete search history.

(56) References Cited

U.S. PATENT DOCUMENTS

| 3,409,949 | A | * | 11/1968 | Kobrehel et al. ........... 242/381.3 |
| 4,720,148 | A | * | 1/1988 | Anthony et al. ............... 297/474 |
| 5,511,856 | A | * | 4/1996 | Merrick et al. ............... 297/476 |
| 7,837,275 | B2 | * | 11/2010 | Woellert et al. ............... 297/474 |
| 7,862,124 | B2 | * | 1/2011 | Dingman ....................... 297/476 |
| 8,291,555 | B2 | | 10/2012 | Buckingham et al. |
| 8,328,281 | B2 | * | 12/2012 | Balensiefer et al. ..... 297/256.14 |
| 8,444,222 | B2 | * | 5/2013 | Buckingham et al. ........ 297/253 |
| 8,646,158 | B2 | | 2/2014 | Buckingham et al. |
| 8,840,184 | B2 | * | 9/2014 | Szakelyhidi et al. .... 297/256.13 |
| 8,944,503 | B2 | * | 2/2015 | Gates et al. .............. 297/256.15 |

FOREIGN PATENT DOCUMENTS

EP           2623368 A1     8/2013

* cited by examiner

*Primary Examiner* — Laurie Cranmer
(74) *Attorney, Agent, or Firm* — David I. Roche; Baker & McKenzie LLP

(57) ABSTRACT

A restraint harness assembly for a child safety seat includes a strap, an anchoring mechanism and a retractor mechanism. The anchoring mechanism includes a first release button operable to switch the anchoring mechanism from a locked to an unlocked state. The retractor mechanism includes a spool connected with the strap, and a second release button movable between a first and a second position for respectively unlocking and locking rotation of the spool in a direction for unwinding the strap. The first and second release buttons are engaged with each other when the anchoring mechanism is in the unlocked state and the second release button is in the first position. The first release button can disengage from the second release button when the anchoring mechanism is switched from the unlocked to the locked state, which allows the second release button to move from the first to the second position.

22 Claims, 4 Drawing Sheets

RESTRAINT HARNESS ASSEMBLY FOR A CHILD SAFETY SEAT

CROSS-REFERENCE TO RELATED APPLICATION

This application claims priority to U.S. Provisional Patent Application No. 61/852,790 filed on Mar. 21, 2013, which is incorporated herein by reference.

BACKGROUND

1. Field of the Invention

The present invention relates to restraint harness assemblies used for installing a child safety seat in a vehicle.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. Therefore, safety legislations require the use of a child safety seat for seating a young child in a vehicle. The child safety seat can be attached with anchor points provided in the vehicle, whereas the child safety seat has a separate harness more adapted to restrain the young child.

Current studies show that the proper installation of the child safety seat in a vehicle can substantially decrease the risk of child injuries when vehicle crashes occur. In certain current designs, a restraint harness may be used to fasten the child safety seat with the anchor points of the vehicle. The restraint harness may include a strap having two ends provided with anchoring connectors. The anchoring connectors can engage with the anchor points of the vehicle, and may further include a tensioning mechanism for pulling the slack of the strap after connection to the anchor points. However, the current designs of the anchoring connector usually require separate operation of the tensioning mechanism, which may not be convenient to operate.

Therefore, there is a need for a restraint harness assembly that can be convenient to operate and address at least the foregoing issues.

SUMMARY

The present application describes a restraint harness assembly for attaching a child safety seat in a vehicle. In one embodiment, the restraint harness assembly includes a strap having an end portion, an anchoring mechanism including a first release button, and a retractor mechanism. The anchoring mechanism has a locked state for fastening with an anchor of a vehicle, and an unlocked state for unfastening from the anchor, the first release button being operable to switch the anchoring mechanism from the locked state to the unlocked state. The retractor mechanism includes a spool connected with the end portion of the strap, and a second release button movable between a first position unlocking rotation of the spool in a direction for unwinding the strap, and a second position locking rotation of the spool in the direction for unwinding the strap. The first release button and the second release button are engaged with each other when the anchoring mechanism is in the unlocked state and the second release button is in the first position, and the first release button is driven to disengage from the second release button when the anchoring mechanism is switched from the unlocked state from the locked state, the second release button when disengaged from the first release button being biased to move from the first position to the second position.

In another embodiment, the restraint harness assembly includes a strap having an end portion, an anchoring mechanism including a first release button, and a retractor mechanism. The anchoring mechanism has a locked state for fastening with an anchor of a vehicle, and an unlocked state for unfastening from the anchor. The retractor mechanism includes a spool connected with the end portion of the strap, and a second release button operable to lock and unlock rotation of the spool in a direction for unwinding the strap, the retractor mechanism being in a latched state when rotation of the spool in the direction for unwinding the strap is locked, and the retractor mechanism being in an unlatched state when rotation of the spool in the direction for unwinding the strap is allowed. The first release button is operable to switch the anchoring mechanism from the locked state to the unlocked state, and to trigger a displacement of the second release button that switches the retractor mechanism from the unlatched state to the latched state.

DETAILED DESCRIPTION OF THE EMBODIMENTS

Figure 1:
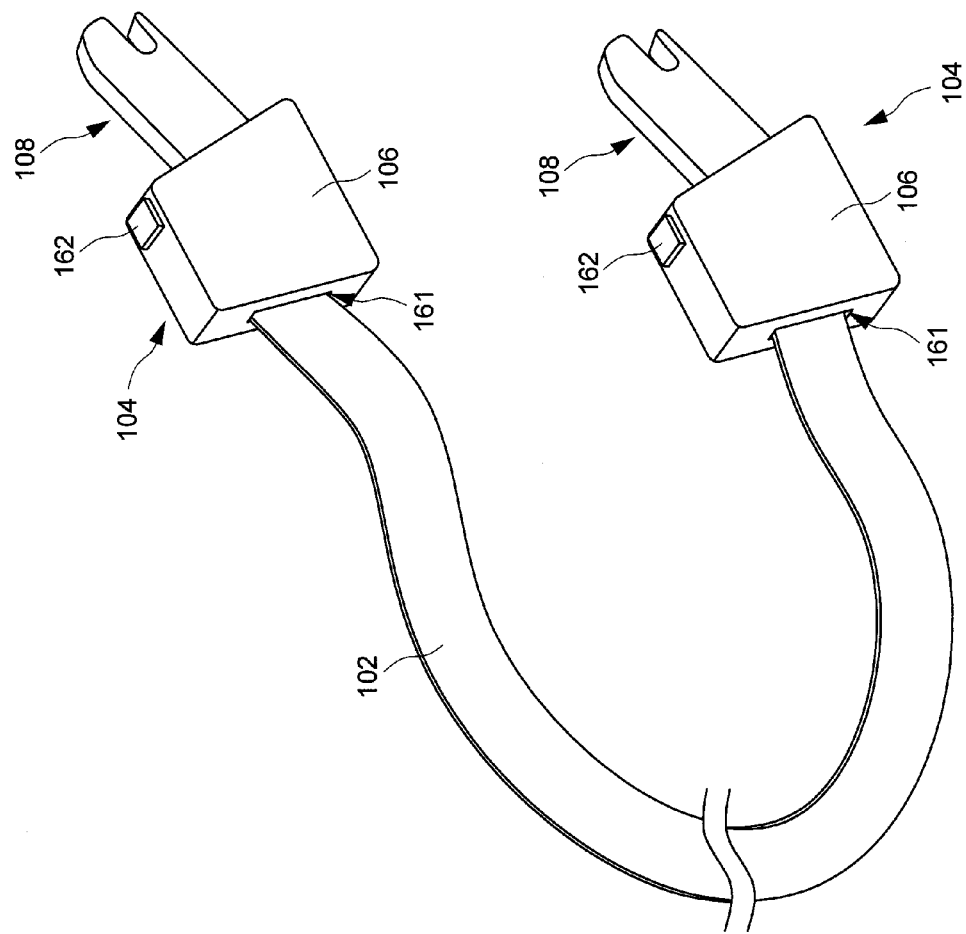
FIG. 1 is a schematic view illustrating a restraint harness assembly operable to attach a child safety seat with anchor points of a vehicle.

FIG. 1 is a schematic view illustrating a restraint harness assembly 100 operable to attach a child safety seat in a vehicle. The restraint harness assembly 100 can include a strap 102 having two opposite ends respectively assembled with two connector assemblies 104. When a child safety seat is installed on a vehicle seat, the harness assembly 100 can be routed through the child safety seat (e.g., a support base of the child safety seat), and the two connector assemblies 104 can respectively attach with two anchor points provided in the vehicle.

Figure 2:
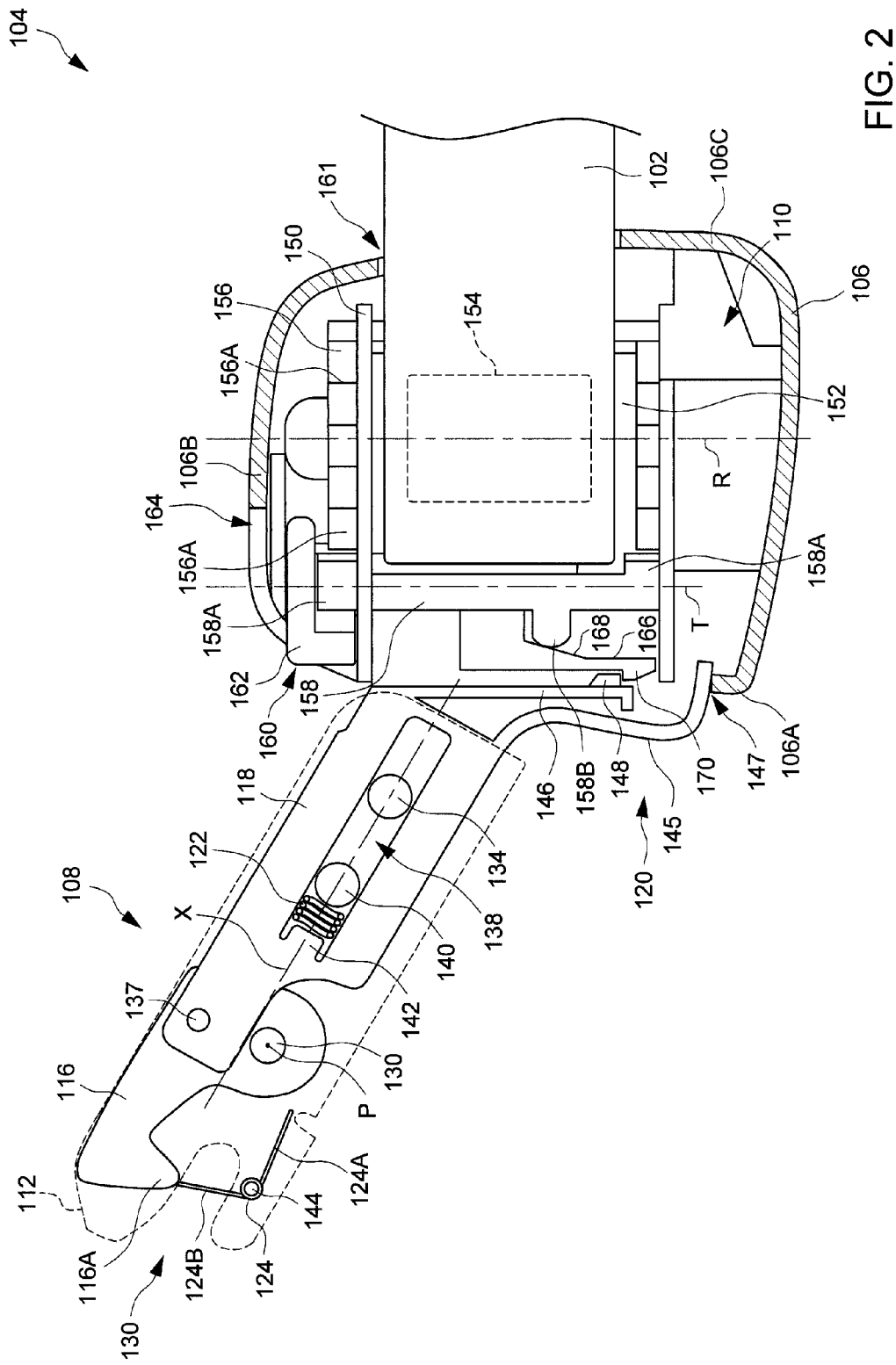
FIG. 2 is a schematic view illustrating the construction of a connector assembly used in the restraint harness assembly.

FIG. 2 is a schematic view illustrating the construction of one connector assembly 104. The two connector assemblies 104 can be similar in construction. Each of the connector assemblies 104 can include a casing 106, an anchoring mechanism 108 and a retractor mechanism 110. The casing 106 can have three side edges 106A, 106B and 106C, the side edge 106B being respectively contiguous to the side edges 106A and 106C. The anchoring mechanism 108 can be affixed with the casing 106 adjacent to the side edge 106A, and can project outward the casing 106. The anchoring mechanism 108 can be operable to fasten to and unfasten from an anchor in the vehicle. For facilitating the attachment of the harness assembly 100, the retractor mechanism 110 can wind and unwind the strap 102 so as to modify a length of the strap 102 extending outside the retractor mechanism 110. The retractor mechanism 110 can be substantially enclosed in the casing 106.

Figure 3:
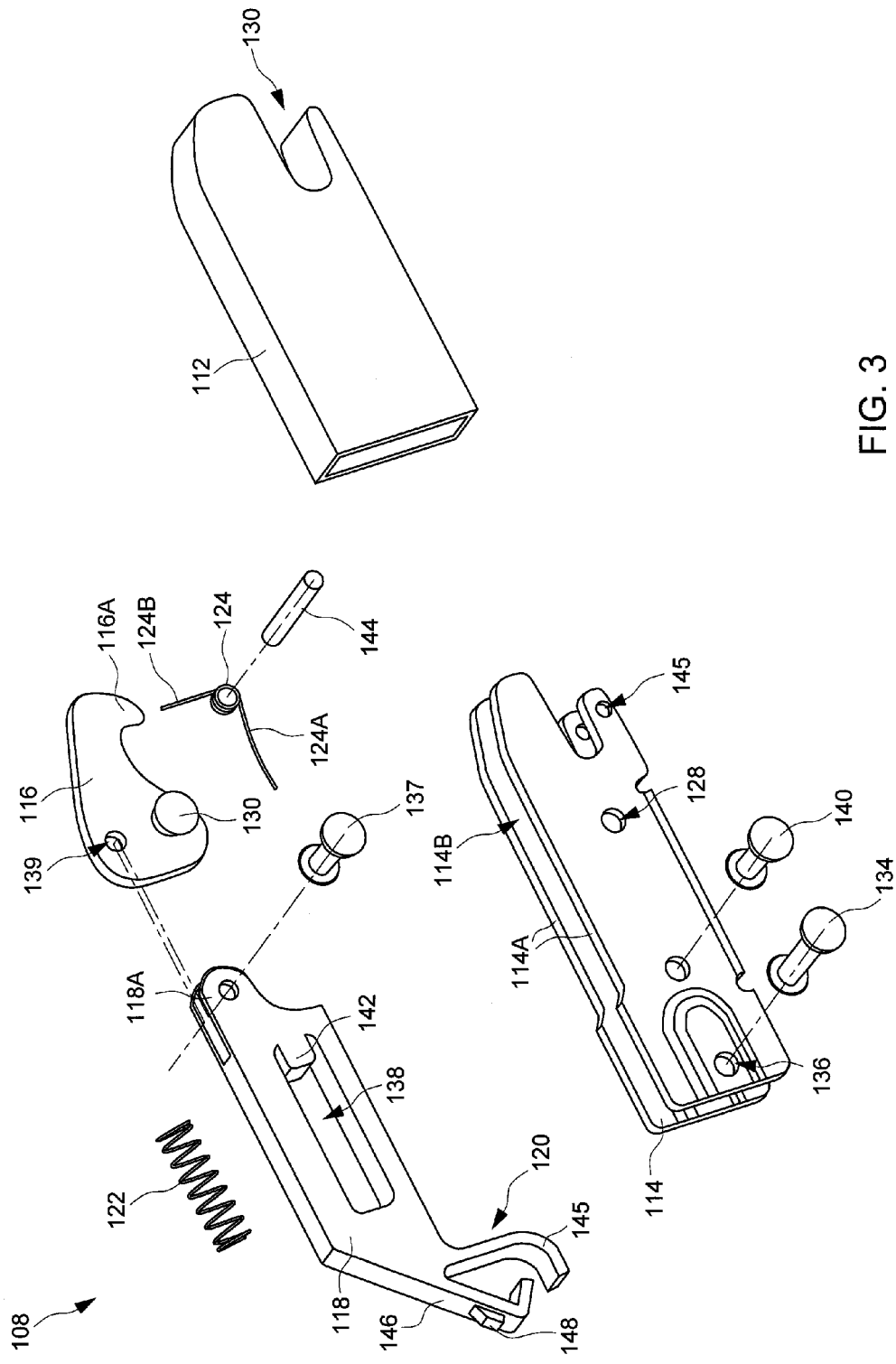
FIG. 3 is an exploded view illustrating the construction of an anchoring mechanism integrated in the connector assembly shown in FIG. 2.

In conjunction with FIG. 2, FIG. 3 is an exploded view illustrating the anchoring mechanism 108. The anchoring mechanism 108 can include a housing 112, a guide frame 114, a latch 116, a linkage 118, a release button 120, a spring 122 and an abutting part 124. The housing 112 can have an end portion formed with an opening 130, and can have a hollow interior through which are assembled the guide frame 114, the latch 116, the linkage 118, the spring 122 and the abutting part 124. The guide frame 114 can be fixedly assembled in the housing 112. In one embodiment, the guide frame 114 can have an elongated shape, and can have two parallel sidewalls 114A separated from each other by a gap 114B. For clarity, the representation of the guide frame 114 is omitted in FIG. 2.

The latch 116 can be disposed in the gap 114B between the two sidewalls 114A of the guide frame 114, and can be pivotally assembled with the guide frame 114 adjacent to the opening 130. A shaft portion 130 (such as a pin or a rivet) can be affixed through holes 128 formed on the two sidewalls 114A, and can extend across the gap 114B so as to pivotally connect the latch 116 with the guide frame 114. The latch 116 can have a plate shape, and can have an engaging end 116A formed with a hook shape. The latch 116 can rotate about a pivot axis P relative to the housing 112 and the guide frame 114 toward or away the opening 130 to respectively effect a locked and an unlocked state of the anchoring mechanism 108. In the locked state, the latch 116 can retain an anchor 202 of a vehicle (as better shown in FIG. 4) in the opening 130 such that the connector assembly 104 can be securely fasten with the anchor 202. In the unlocked state, the latch 116 can open so as to allow removal of the anchor 202 for unfastening the connector assembly 104 (as better shown in FIG. 2).

The linkage 118 can be assembled with the guide frame 114 for sliding displacement along a lengthwise axis X relative to the guide frame 114 and the housing 112. The linkage 118 can be arranged through the gap 114B, and a pin 134 can be affixed through two holes 136 of the guide frame 114 and pass through an elongated slot 138 of the linkage 118 to guide the linkage 118 for sliding movement relative to the guide frame 114 and the housing 112. An end portion 118A of the linkage 118 can be pivotally connected with the latch 116 at a location eccentric from the pivot axis P. For example, a shaft portion 137 may be assembled through the end portion 118A of the linkage 118 and a hole 139 of the latch 116 to pivotally connect the latch 116 with the linkage 118. The linkage 118 can slide along the lengthwise axis X in a first direction away from the opening 130 to drive rotation of the latch 116 toward the unlocked state, and can slide along the lengthwise axis X in a second direction toward the opening 130 to drive rotation of the latch 116 toward the locked state.

The spring 122 can bias the linkage 118 toward the opening 130 so that the linkage 118 can cause rotation of the latch 116 toward the locked state. The spring 122 can have a first end connected with the guide frame 114 (e.g., a pin 140 affixed with the guide frame 114 through the gap 114B), and a second end anchored with the linkage 118 (e.g., with a protrusion 142 formed with the linkage 118).

The abutting part 124 can interact with the latch 116, and can be biased to keep the latch 116 in the unlocked state. In one embodiment, the abutting part 124 can be exemplary a torsion spring, and can have a first and a second end 124A and 124B and is assembled around a shaft portion 144 (e.g., a pin or rivet) affixed through a hole 145 of the guide frame 114. The first end 124A of the abutting part 124 can be connected with the guide frame 114, and the second end 124B of the abutting part 124 is movable toward and away from a point of contact on the latch 116, e.g., located on the engaging end 116A of the latch 116. The abutting part 124 can be biased in a direction for causing the second end 124B to contact with the engaging end 116A of the latch 116. In particular, when the second end 124B abuts against the point of contact on the latch 116, the abutting part 124 can act against the spring force of the spring 112 applied on the linkage 118 and keep the latch 116 in the unlocked state. When the second end 124B of the abuttal part 124 is forced to move away and disengage from its point of contact with the latch 116, the linkage 118 biased by the spring 112 can move toward the opening 130 and drive rotation of the latch 116 to the locked state.

The release button 120 can be affixed with the linkage 118, and can be assembled for sliding displacement with the linkage 118 relative to the guide frame 114 and the housing 112. In one embodiment, the release button 120 can be formed integrally with the linkage 118. In other embodiments, the release button 120 can be fixedly assembled with the linkage 118 via a fastener element. The release button 120 can include an elongated extension 146 extending at an angle relative to the lengthwise axis X, and a push pad 145 exposed outward through an opening 147 formed on the side edge 106A of the casing 106. The extension 146 can be formed with a protrusion 148 located offset from the lengthwise axis X, and the push pad 145 can be partially received in the casing 106. The release button 120 can be depressed to drive sliding displacement of the linkage 118 along the lengthwise axis X toward the refractor mechanism 110 and away from opening 130 for switching the latch 116 from the locked state to the unlocked state.

Referring again to FIG. 2, the retractor mechanism 110 can include a support frame 150, a spool 152, a spring 154 (shown with phantom lines), two ratchet gears 156, a pawl 158 and a release button 160. The support frame 150 can be affixed with the casing 106. The spool 152 can be pivotally connected with the support frame 150 about a pivot axis R, and can be connected with one end portion of the strap 102 that extends outside the casing 106 through an opening 161 formed on the side edge 106C of the casing 106. The spring 154 can be connected with the spool 152, and can operate to bias the spool 152 in rotation for winding the strap 102 around the spool 152. The two ratchet gears 156 can be respectively affixed with the spool 152, and can rotate along with the spool 152.

The pawl 158 can be movably assembled with the support frame 150 adjacent to the ratchet gears 156. In particular, the pawl 158 can be pivotally connected with the support frame 150 about a pivot axis T that is parallel to the pivot axis R of the spool 152, and can include two prongs 158A that can respectively engage with any of a plurality of teeth 156A respectively formed on the ratchet gears 156. The teeth 156A are shaped so that the respective engagement of the two prongs 158A with the two ratchet gears 156 can block rotation of the spool 152 in a direction for unwinding the strap 102 while allowing rotation of the spool 152 in an opposite direction for winding the strap 108. The pawl 158 can further include an extension 158B located between the two prongs 158A and extending radially relative to the pivot axis T of the pawl 158. The extension 158B can be connected with the release button 160, so that a displacement of the release button 160 can drive rotation of the pawl 158 about the pivot axis T to engage or disengage the ratchet gears 156.

The release button 160 can be assembled with the support frame 150 for sliding movement parallel to the pivot axes R and T of the spool 152 and the pawl 158.

The release button 160 can include a push pad 162 that can be exposed through an opening 164 formed on the side edge 106B of the casing 106. Moreover, the release button 160 can include an elongated extension 166 that extends past the extension 158B of the pawl 158. The extension 166 of the release button 160 can have a first side edge formed with a ramp surface 168, and a second side edge opposite to the ramp surface 168 that is formed with a protrusion 170. The release button 160, including the push pad 162, the extension 166 and the protrusion 170 may be formed as an integral body.

The release button 160 is assembled such that the extension 166 thereof and the extension 146 of the release button 120 can face each other, and the ramp surface 168 can be in sliding contact with the extension 158B of the pawl 158. Moreover, the displacement axis of the release button 120 (i.e., the lengthwise axis X) can be inclined a same angle relative to the pivot axis R of the spool 152 and relative to the displacement axis of the release button 160. Owing to the sliding contact between the extension 158B and the ramp surface 168, sliding movements of the release button 160 can drive rotational displacements of the pawl 158. More specifically, a sliding displacement of the release button 160 in a first direction can drive rotation of the pawl 158 to engage with the ratchet gears 156 and thereby effect a latched state of the retractor mechanism 110, and a sliding displacement of the release button 160 in an opposite second direction can drive reverse rotation of the pawl 158 to disengage from the ratchet gears 156 and thereby effect an unlatched state of the retractor mechanism 110. In the latched state, the pawl 158 can block rotation of the spool 152 in a direction for unwinding the strap 102 while rotation of the spool 152 in a reverse rotation for winding the strap 102. In the unlatched state, the spool 152 to rotate in either direction to wind and unwind the strap 102.

Figure 4:
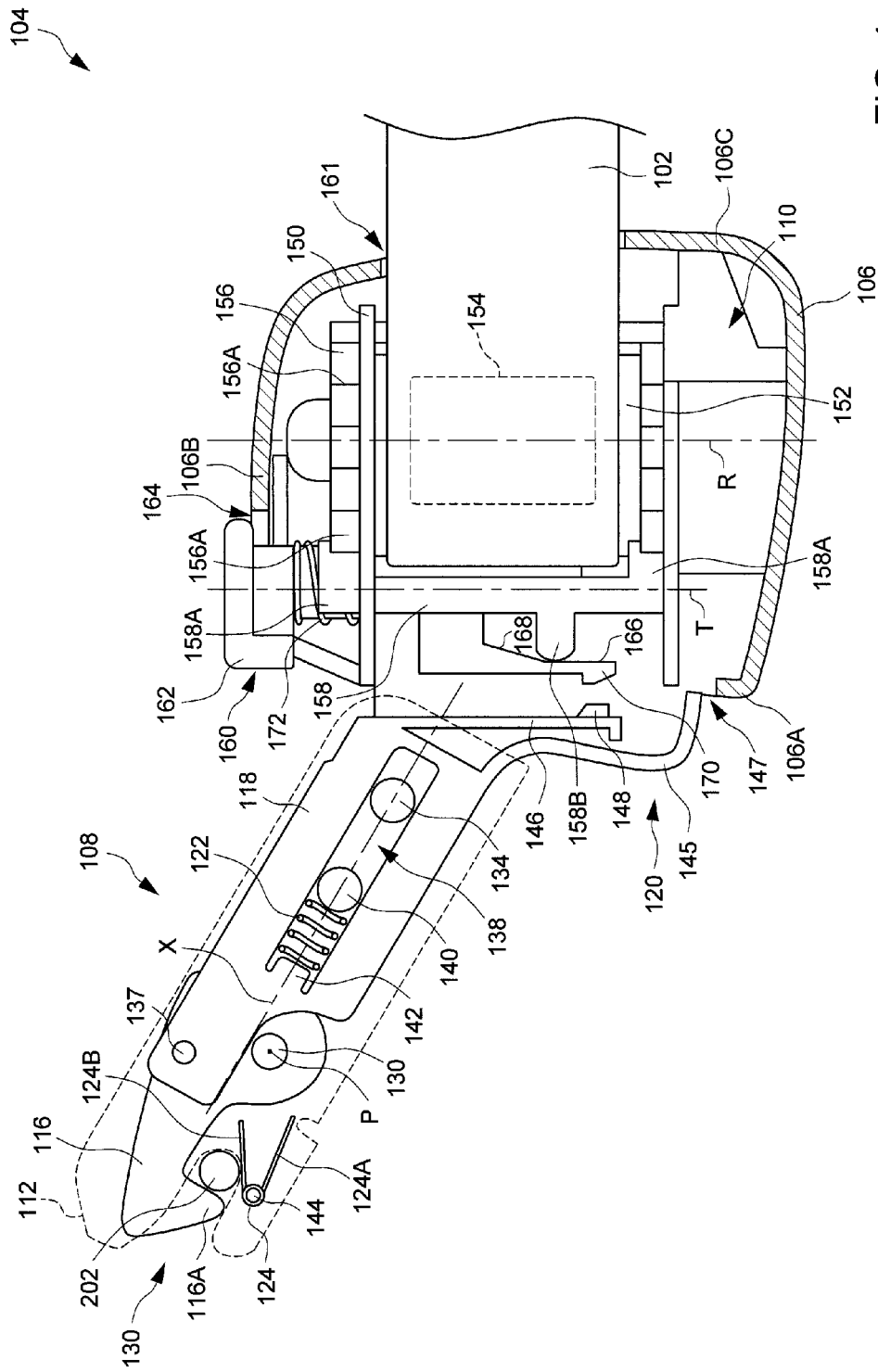
FIG. 4 is a schematic view illustrating the connector assembly in a second configuration.

As better shown in FIG. 4, a spring 172 can also be provided to bias the release button 160 toward the latched state. For example, the spring 172 can have a first end connected with the support frame 150, and a second end connected with the release button 160 near the push pad 162.

With the aforementioned construction, the release button 120 can be operable independently from the release button 160 to switch the anchoring mechanism 108 from the locked state to the unlocked state, and the release button 160 can be operable independently from the release button 120 to unlock the retractor mechanism 110 and allow rotation of the spool 152 in the direction for unwinding the strap 102. Moreover, the anchoring mechanism 108 and the retractor mechanism 110 can interact with each other so that a switch of the anchoring mechanism 108 from the unlocked state to the locked state can drive the retractor mechanism 110 to automatically switch from the unlatched state to the latched state. Exemplary operation of the connector assembly 104 is described hereafter with reference to FIGS. 2 and 4.

In FIG. 2, the connector assembly 104 is shown in a first configuration in which the anchoring mechanism 108 is in the unlocked state and the retractor mechanism 110 is in the unlatched state. In this first configuration, the abutting part 124 can abut against the latch 116 to keep it opened against the biasing force exerted by the spring 122, and the release button 120 can be in a depressed position so that the extension 146 of the release button 120 lies adjacent to the extension 166 of the release button 160. Meanwhile, the release button 160 lies in a depressed or first position to compress the spring 172 and cause the pawl 158 to disengage from the ratchet gears 156, which allows the spool 152 to rotate in either direction for winding and unwinding the strap 102. This first position of the release button 160 can be stably maintained by the engagement of the release button 160 with the release button 120, in particular via the engaging contact between the protrusion 170 of the release button 160 and the protrusion 148 of the release button 120, which can counteract the biasing force exerted by the spring 172. Therefore, displacement of the release button 160 for switching the retractor mechanism 110 to the latched state can be prevented when the release buttons 120 and 160 are engaged with each other.

While it is in the first configuration, the connector assembly 104 can be pulled toward an anchor of a vehicle, which may cause unwinding of the strap 102 from the spool 152 of the retractor mechanism 110. The length of the strap 102 extending outward can thereby self-adjust according to the distance between the child safety seat and the anchor point of the vehicle. The anchoring mechanism 108 then can be engaged with the anchor 202 of the vehicle to attach the connector assembly 104 with the anchor 202. The engagement of the anchoring mechanism 108 with the anchor 202 can cause the connector assembly 104 to switch from the first configuration to a second configuration.

FIG. 4 is a schematic view illustrating the connector assembly 104 in the second configuration engaged with the anchor 202. In this second configuration, the anchor 202 can be inserted through the opening 130 to push against the second end 124B and displace the abuttal part 124 out of engagement with the latch 116. As a result, the spring 122 can urge the linkage 118 and the release button 120 to slide in unison along the lengthwise axis X toward the opening 130 and away from the release button 160. This displacement of the linkage 118 and the release button 120 can concurrently drive rotation of the latch 116 to the locked state and displacement of the protrusion 148 of the release button 120 away from the protrusion 170 of the release button 160. The release buttons 120 and 160 can thereby disengage from each other, and the spring 172 then can bias the release button 160 in sliding movement from the first position to a second position for causing the push pad 162 to extend outward through the opening 164 of the casing 106. Owing to the sliding contact between the extension 158B and the ramp surface 168, the sliding displacement of the release button 160 to the second position can drive the pawl 158 to rotate about the pivot axis T to engage with the ratchet gears 156 and lock rotation of the spool 152 in the direction for unwinding the strap 102. The retractor mechanism 110 is thereby switched to the latched state. While the connector assembly 104 is in the second configuration, the biasing force applied by the spring 154 on the spool 152 can generate a pulling force for tensioning the strap 102.

According to the mechanisms described herein, the release button 120 is thus operable to switch the anchoring mechanism 108 from the unlocked state to the locked state, and also trigger the displacement of the release button 160 to switch the retractor mechanism 110 from the unlatched state to the latched state. This feature can facilitate the operation of the connector assembly 104.

For detaching the connector assembly 104 from the anchor 202, the release button 120 can be depressed toward the interior of the casing 106. As a result, the release button 120 can move toward the release button 160 and drives the linkage 118 in sliding displacement away from the opening 130. This sliding displacement of the linkage 118 can in turn drive rotation of the latch 116 to disengage from the anchor 202. The connector assembly 104 then can moved away to remove the anchor 202 from the opening 130. Upon removal of the anchor 202 from the opening 130, the abuttal part 124 can be biased to cause the second end 124B to contact with the latch 116 and keep the latch 116 in the unlocked state. Accordingly, the anchoring mechanism 108 can self-maintain the unlocked state without the need of continuously depressing the release button 120.

For switching the retractor mechanism 110 from the latched state to the unlatched state, the push pad 162 of the release button 160 can be depressed toward the interior of the casing 106, which causes the release button 160 to move from the second position to the first position for compressing the spring 172. Owing to the sliding contact between the extension 158B and the ramp surface 168, this sliding displacement of the release button 160 from the second position to the first position can drive the pawl 158 to rotate about the pivot axis T to disengage from the ratchet gears 156. The retractor mechanism 110 is thereby switched to the unlatched state, and rotation of the spool 152 for winding and unwinding the strap 102 is allowed.

As described previously, the release button 120 is operable independently from the release button 160 to switch the anchoring mechanism 108 from the locked state to the unlocked state, and the release button 160 is operable independently from the release button 120 to switch the retractor mechanism 110 from the latched state to the unlatched state. However, owing to the biasing action of the spring 172, the unlatched state of the retractor mechanism 110 cannot be self-maintained without the engagement between the two release buttons 120 and 160. The engagement of the two release buttons 120 and 160 may be accomplished according to any of the following three methods.

According to a first method, the anchoring mechanism 108 is first switched from the locked state to the unlocked state like previously described. While the anchoring mechanism 108 self-maintains the unlocked state, the retractor mechanism 110 then can be switched from the latched state to the unlatched state by displacing the release button 160 from the second position to the first position. When the release button 160 reaches the first position, the protrusion 170 of the release button 160 can self engage with the protrusion 148 of the release button 120 to lock the retractor mechanism 110 in the unlatched state. The protrusions 148 and 170 can be formed with ramp surfaces that can come into sliding contact with each other to cause respective deflection of the extensions 146 and 166, which can facilitate engagement of the protrusion 148 with the protrusion 170.

According to a second method, the retractor mechanism 110 is first switched from the latched state to the unlatched state like previously described. While the retractor mechanism 110 is kept in the unlatched state by continuously pressing on the push pad 162, the anchoring mechanism 108 then can be switched from the locked state to the unlocked state by displacing the release button 120 toward the release button 160 until the protrusion 148 of the release button 120 engages with the protrusion 170 of the release button 160.

According to a third method, both the release buttons 120 and 160 can be concurrently operated to switch the anchoring mechanism 108 from the locked state to the unlocked state and to switch the retractor mechanism 110 from the latched state to the unlatched state, until the protrusion 148 of the release button 120 engages with the protrusion 170 of the release button 160.

Advantages of the structures described herein include the ability to provide a restraint harness assembly for child safety seats that can integrate an anchoring mechanism and a retractor mechanism in a connector assembly. When the connector assembly fastens to an anchor of a vehicle, the anchoring mechanism and the refractor mechanism can respectively switch to their respective locked states in a concurrent manner.

Realizations of the restraint harness assembly have been described in the context of particular embodiments. These embodiments are meant to be illustrative and not limiting. Many variations, modifications, additions, and improvements are possible.

These and other variations, modifications, additions, and improvements may fall within the scope of the inventions as defined in the claims that follow.

What is claimed is:

1. A restraint harness assembly operable to attach a child safety seat in a vehicle, the harness assembly comprising:
    a strap having an end portion;
    an anchoring mechanism including a first release button, the anchoring mechanism having a locked state for fastening with an anchor of a vehicle, and an unlocked state for unfastening from the anchor, the first release button being operable to switch the anchoring mechanism from the locked state to the unlocked state; and
    a retractor mechanism including a spool connected with the end portion of the strap, and a second release button movable between a first position unlocking rotation of the spool in a direction for unwinding the strap, and a second position locking rotation of the spool in the direction for unwinding the strap;
    wherein the first release button and the second release button are engaged with each other when the anchoring mechanism is in the unlocked state and the second release button is in the first position, and the first release button is driven to disengage from the second release button when the anchoring mechanism is switched from the unlocked state to the locked state, the second release button when disengaged from the first release button being biased to move from the first position to the second position.

2. The restraint harness assembly according to claim 1, further including a casing, the anchoring mechanism and the retractor mechanism being fixedly assembled with the casing.

3. The restraint harness assembly according to claim 2, wherein the casing has a first and a second side edge contiguous to each other, the first release button being exposed at the first side edge, and the second release button being exposed at the second side edge.

4. The restraint harness assembly according to claim 1, wherein the spool is rotatable about a pivot axis, and the second release button is operable to slide parallel to the pivot axis.

5. The restraint harness assembly according to claim 4, wherein the first release button is operable to slide along a displacement axis inclined at an angle relative to the pivot axis.

6. The restraint harness assembly according to claim 1, wherein the first release button has a first protrusion, the second release button has a second protrusion, the first and second protrusions engaging with each other to maintain the second release button in the first position.

7. The restraint harness assembly according to claim 6, wherein the second release button is connected with a spring, the spring biasing the second release button to move from the first position toward the second position when the first protrusion is disengaged from the second protrusion.

8. The restraint harness assembly according to claim 1, wherein the first release button is operable independently from the second release button to switch the anchoring mechanism from the locked state to the unlocked state, and the second release button is operable independently from the first release button to unlock rotation of the spool in the direction for unwinding the strap.

9. The restraint harness assembly according to claim 1, wherein the retractor mechanism further includes:

a support frame pivotally assembled with the spool;
a ratchet gear affixed with the spool; and
a pawl movably assembled with the support frame and connected with the second release button;
wherein a displacement of the second release button from the first position to the second position drives a movement of the pawl to engage with the ratchet gear, and a displacement of the second release button from the second to the first position drives a movement of the pawl to disengage from the ratchet gear.

10. The restraint harness assembly according to claim 9, wherein the pawl is pivotally assembled with the support frame.

11. The restraint harness assembly according to claim 9, wherein the second release button includes a ramp surface, and the pawl includes an extension in sliding contact with the ramp surface.

12. The restraint harness assembly according to claim 1, wherein the anchoring mechanism further includes:
a latch operable to engage with an anchor of a vehicle; and
a linkage connected with the latch and the first release button, the linkage and the first release button being movable in unison to drive a rotational displacement of the latch for disengaging from the anchor.

13. A restraint harness assembly operable to attach a child safety seat with an anchor, the harness assembly comprising:
a strap having an end portion;
an anchoring mechanism including a first release button, the anchoring mechanism having a locked state for fastening with an anchor of a vehicle, and an unlocked state for unfastening from the anchor; and
a retractor mechanism including a spool connected with the end portion of the strap, and a second release button operable to lock and unlock rotation of the spool in a direction for unwinding the strap, the retractor mechanism being in a latched state when rotation of the spool in the direction for unwinding the strap is locked, and the retractor mechanism being in an unlatched state when rotation of the spool in the direction for unwinding the strap is allowed;
wherein the first release button is operable to switch the anchoring mechanism from the locked state to the unlocked state, and to trigger a displacement of the second release button that switches the retractor mechanism from the unlatched state to the latched state.

14. The restraint harness assembly according to claim 13, wherein the first release button and the second release button are engaged with each other when the anchoring mechanism is in the unlocked state and the retractor mechanism is in the unlatched state.

15. The restraint harness assembly according to claim 14, wherein the second release button is connected with a spring, the spring urging the displacement of the second release button for switching the retractor mechanism from the unlatched state to the latched state.

16. The restraint harness assembly according to claim 14, wherein the first release button has a first protrusion, the second release button has a second protrusion, the first and second protrusions engaging with each other to maintain the retractor mechanism in the unlatched state.

17. The restraint harness assembly according to claim 13, wherein the spool is rotatable about a pivot axis, and the second release button is operable to slide parallel to the pivot axis.

18. The restraint harness assembly according to claim 17, wherein the first release button is operable to slide along a displacement axis inclined at an angle relative to the pivot axis.

19. The restraint harness assembly according to claim 13, wherein the first release button is operable independently from the second release button to switch the anchoring mechanism from the locked state to the unlocked state, and the second release button is operable independently from the first release button to switch the retractor mechanism from the latched state to the unlatched state.

20. The restraint harness assembly according to claim 13, wherein the retractor mechanism further includes:
a support frame pivotally assembled with the spool;
a ratchet gear affixed with the spool; and
a pawl pivotally assembled with the support frame and connected with the second release button;
wherein the pawl is disengaged from the ratchet gear when the retractor mechanism is in the unlatched state, and the displacement of the second release button for switching the retractor mechanism from the latched state to the unlatched state drives rotation of the pawl to disengage from the ratchet gear.

21. The restraint harness assembly according to claim 20, wherein the second release button includes a ramp surface, and the pawl includes an extension in sliding contact with the ramp surface.

22. The restraint harness assembly according to claim 13, wherein the anchoring mechanism further includes:
a latch operable to engage with an anchor of a vehicle; and
a linkage connected with the latch and the first release button, the linkage and the first release button being movable in unison to drive a rotational displacement of the latch for disengaging from the anchor.

* * * * *